(12) United States Patent
Hoffman et al.

(10) Patent No.: US 8,016,714 B2
(45) Date of Patent: Sep. 13, 2011

(54) MULTIPLE SPEED TRANSMISSION UTILIZING CO-PLANAR GEAR SETS

(75) Inventors: Donald Edward Hoffman, Canton, MI (US); Steven Gerald Thomas, Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 602 days.

(21) Appl. No.: 12/194,165

(22) Filed: Aug. 19, 2008

(65) Prior Publication Data

US 2010/0048346 A1    Feb. 25, 2010

(51) Int. Cl.
*F16H 3/44* (2006.01)
*F16H 3/70* (2006.01)

(52) U.S. Cl. .................. 475/284; 475/173

(58) Field of Classification Search .......... 475/269, 475/271–291, 296, 330, 169, 171, 173
See application file for complete search history.

(56) References Cited

U.S. PATENT DOCUMENTS

| | | | |
|---|---|---|---|
| 1,124,783 A | 1/1915 | Moore | |
| 1,990,345 A | 2/1935 | Orr | |
| 2,322,394 A * | 6/1943 | Sharpe | 475/169 |
| 4,762,025 A | 8/1988 | Lew | |
| 4,807,494 A * | 2/1989 | Lew | 475/166 |
| 5,055,093 A | 10/1991 | Denker | |
| 5,106,352 A | 4/1992 | Lepelletier | |
| 5,324,240 A * | 6/1994 | Guttinger | 475/162 |
| 6,126,566 A | 10/2000 | Kerr | |
| 6,582,337 B2 | 6/2003 | Bowen et al. | |
| 6,632,152 B1 | 10/2003 | Tiufektchian | |
| 6,669,594 B2 | 12/2003 | Kerr | |
| 6,860,831 B2 | 3/2005 | Ziemer | |
| 7,008,346 B2 | 3/2006 | Stevenson | |
| 7,235,032 B2 | 6/2007 | Thomas et al. | |
| 7,300,383 B2 | 11/2007 | Noaki et al. | |
| 7,353,789 B2 * | 4/2008 | Gregor et al. | 123/90.17 |
| 2002/0025875 A1 | 2/2002 | Tsujioka | |
| 2007/0037657 A1 | 2/2007 | Thomas et al. | |
| 2007/0060438 A1 | 3/2007 | Fukuyama et al. | |
| 2007/0232436 A1 | 10/2007 | Lepelletier | |

FOREIGN PATENT DOCUMENTS

GB     2183752 A  *  6/1987

OTHER PUBLICATIONS

Ker-Train Research Inc., 8 pages, Kingston, Ontario, Canada.

* cited by examiner

*Primary Examiner* — Roger Pang
(74) *Attorney, Agent, or Firm* — David Kelley

(57) ABSTRACT

A multiple speed power transmission, comprising an input shaft; a transmission case; a co-planar gear set; a rear epicyclic gearing assembly with four rotating members; a first clutch connecting the output of the co-planar gear set to the fourth rotating member; a second clutch connecting the output of the co-planar gear set to the first rotating member; a third clutch connecting the input shaft to the third rotating member; a first brake holding the fourth rotating member against rotation; a second brake holding the third rotating member against rotation; and an output shaft connected to the second rotating member.

21 Claims, 11 Drawing Sheets

| Element Number | Number of teeth |
|---|---|
| 38 | 56 |
| 40 | 126 |
| 46 | 80 |
| 48 | 100 |
| 52 | 38 |
| 54 | 88 |
| 58 | 25 |
| 60 | 31 |
| 62 | 88 |
| 66 | 63 |
| 68 | 63 |

Fig. 2

| Ratio # | Clutch 70 | Clutch 72 | Clutch 74 | Clutch 76 | Brake 78 | Brake 80 | Speed Ratio |
|---|---|---|---|---|---|---|---|
| R1 |  | X |  |  |  | X | -5.211 |
| R2 | X |  |  |  |  | X | -2.316 |
| 1st |  |  | X |  |  | X | 6.387 |
| 2nd |  | X | X |  | X |  | 3.498 |
| 3rd | X |  | X |  |  |  | 2.250 |
| 4th |  |  | X | X |  |  | 1.556 |
| 5th | X |  |  | X |  |  | 1.243 |
| 6th |  | X |  | X |  |  | 1.000 |
| 7th |  |  |  | X | X |  | 0.807 |
| 8th |  |  |  |  |  |  | 0.698 |

Fig. 3

| Element Number | Number of teeth |
|---|---|
| 38 | 56 |
| 40 | 160 |
| 46 | 96 |
| 48 | 120 |
| 52 | 38 |
| 54 | 88 |
| 58 | 25 |
| 60 | 34 |
| 62 | 88 |
| 66 | 66 |
| 68 | 66 |

Fig. 5

| Ratio # | Clutch 72 | Clutch 74 | Clutch 76 | Brake 78 | Brake 80 | Brake 82 | Speed Ratio |
|---|---|---|---|---|---|---|---|
| R1 | X | | | | X | X | -4.117 |
| 1st | | X | | | X | X | 4.601 |
| 2nd | | X | | X | | X | 2.629 |
| 3rd | X | X | | | | X | 1.778 |
| 4th | | X | X | | | X | 1.203 |
| 5th | X | X | X | | | | 1.000 |
| 6th | X | | X | | | X | 0.841 |
| 7th | | | X | X | | X | 0.698 |

Fig. 6

| Element Number | Number of teeth |
|---|---|
| 98 | 56 |
| 100 | 126 |
| 106 | 97 |
| 108 | 97 |
| 112 | 62 |
| 114 / 116 | 114 |
| 120 / 121 | 26 |
| 122 | 38 |
| 124 | 88 |
| 128 | 25 |

Fig. 8

| Ratio # | Clutch 130 | Clutch 132 | Clutch 134 | Clutch 136 | Brake 138 | Brake 140 | Speed Ratio |
|---|---|---|---|---|---|---|---|
| R1 |  | X |  |  |  | X | -5.211 |
| R2 | X |  |  |  |  | X | -2.316 |
| 1st |  |  | X |  |  | X | 6.387 |
| 2nd |  | X | X |  | X |  | 3.498 |
| 3rd | X |  | X |  |  |  | 2.250 |
| 4th |  |  | X | X |  |  | 1.556 |
| 5th | X |  |  | X |  |  | 1.243 |
| 6th |  |  |  | X |  |  | 1.000 |
| 7th |  | X |  | X |  |  | 0.807 |
| 8th |  |  |  | X | X |  | 0.698 |

Fig. 9

MULTIPLE SPEED TRANSMISSION
UTILIZING CO-PLANAR GEAR SETS

BACKGROUND OF THE INVENTION

This invention relates to the field of automatic transmissions for motor vehicles. More particularly, the invention pertains to a kinematic arrangement of gearing, clutches, brakes, and the interconnections among them in a power transmission.

BRIEF DESCRIPTION OF THE DRAWINGS

FIG. 2 is a table showing proposed tooth numbers for the gears of the transmission illustrated in FIG. 1.

FIG. 3 is a table indicating the states of the clutches and resulting speed ratio of the transmission in FIG. 1 when the gears have the number of teeth indicated in FIG. 2.

FIG. 5 is a table showing proposed tooth numbers for the gears of the transmission illustrated in FIG. 4.

FIG. 6 is a table indicating the states of the clutches and resulting speed ratio of the transmission in FIG. 4 when the gears have the number of teeth indicated in FIG. 5.

FIG. 8 is a table showing the proposed tooth numbers for the gears of the transmission illustrated in FIG. 7.

FIG. 9 is a table indicating the states of the clutches and resulting speed ratio of the transmission in FIG. 7 when the gears have the number of teeth indicated in FIG. 8.

DETAILED DESCRIPTION OF THE PREFERRED EMBODIMENT

Figure 10:
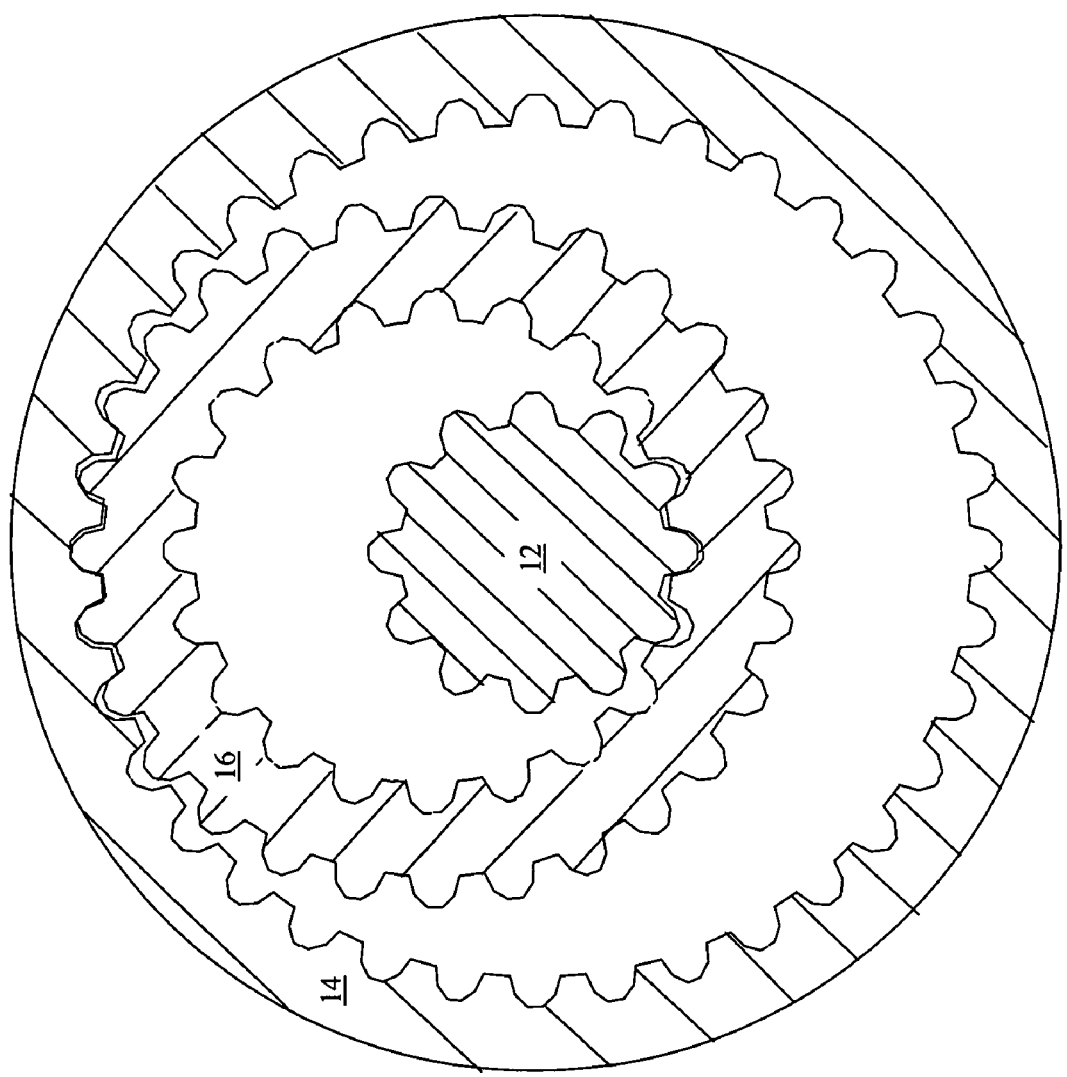
FIGS. 10 and 11 are cross sectional views of a co-planar gear set.
Figure 11:
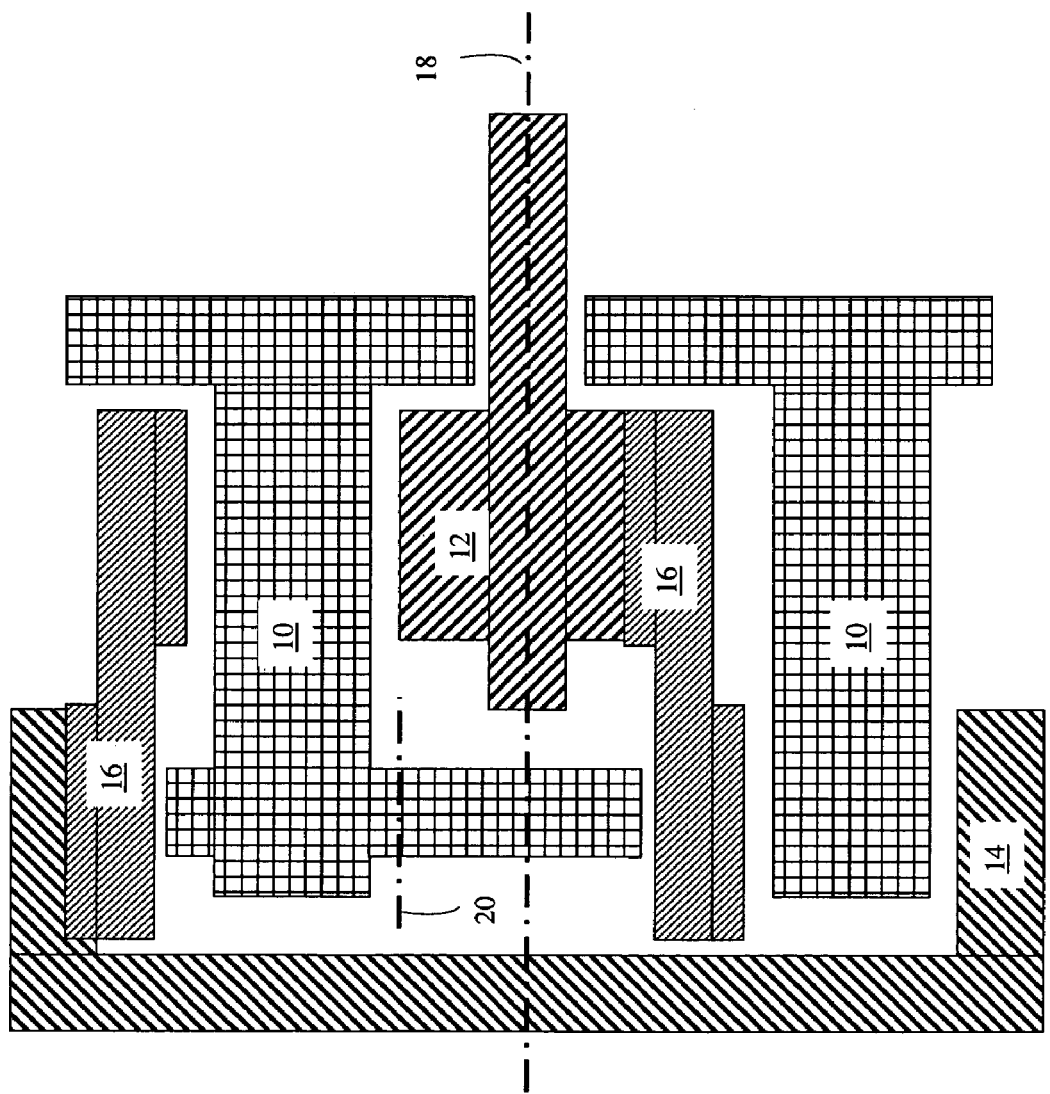

This invention utilizes co-planar gear sets similar to those described in U.S. Pat. Nos. 5,030,184 and 6,126,566. For clarity, an example of a co-planar gear set is illustrated in FIGS. 10 and 11 and described below. Sun gear 12, carrier 10, and ring gear 14 are typically supported for rotation around centerline 18, although in some applications one of them may be held against rotation. Eccentric gear 16 is supported by carrier 10 for rotation about centerline 20. Centerline 20 rotates around centerline 18 along with carrier 10. Internal gear teeth on eccentric gear 16 engage external gear teeth on sun gear 12. External gear teeth on eccentric gear 16 engage internal gear teeth on ring gear 14. The rotational speed of ring gear 14 is a weighted average of the rotational speeds of sun gear 12 and carrier 10, with the weighting factors determined by the numbers of teeth. The name co-planar gear set is used even in embodiments wherein the components do not all occupy a single plane, such as the embodiment illustrated in FIG. 11.

Figure 1:
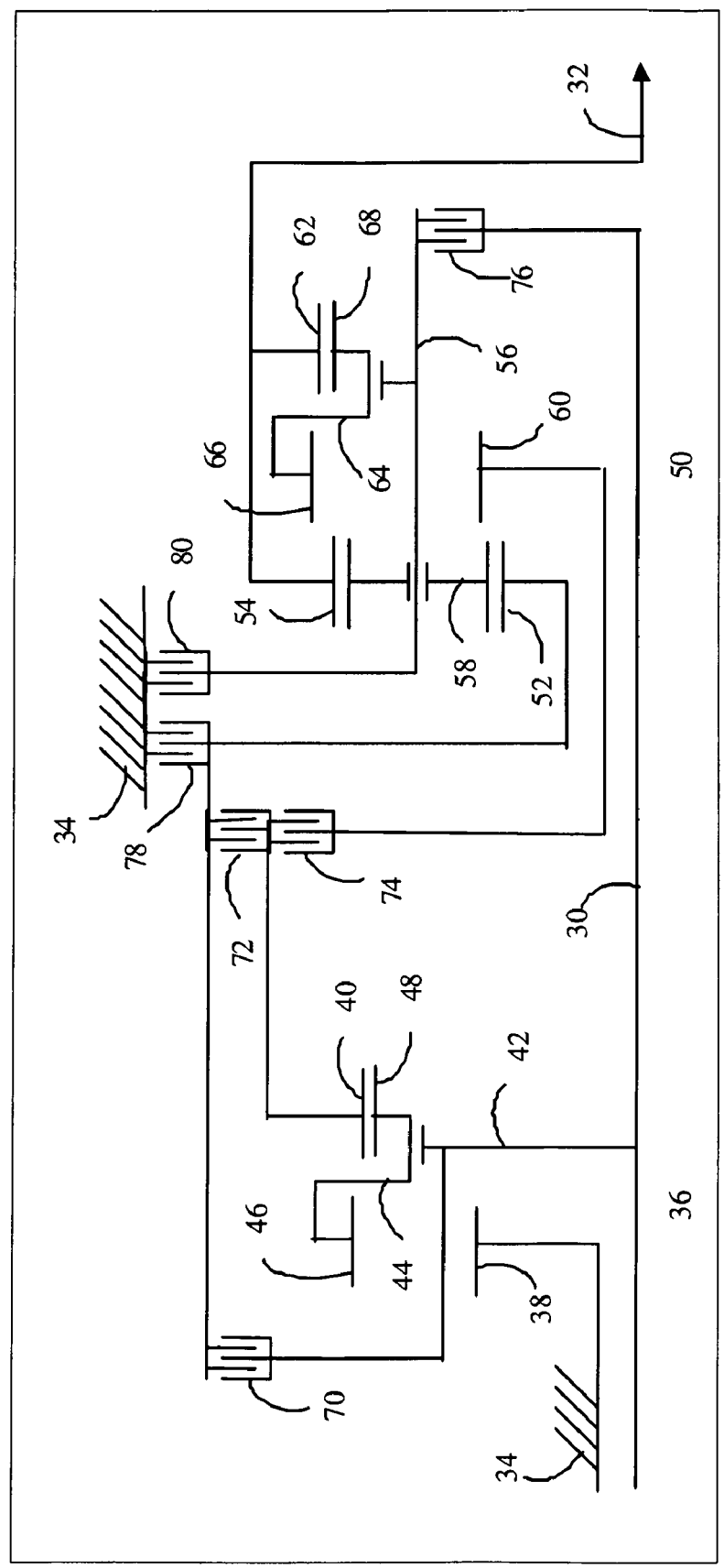
FIG. 1 is a schematic diagram of a transmission according to a first embodiment of the present invention which produces eight forward and two reverse speed ratios.

A transmission according to a first embodiment of the present invention is illustrated schematically in FIG. 1. Input shaft 30 is driven by the vehicle engine, preferably via a torque converter. Output shaft 32 drives the vehicle wheels, preferably via a differential.

A front co-planar gear set 36 includes a sun gear with external gear teeth 38, a ring gear with internal gear teeth 40, a carrier 42, and an epicyclic gear 44 supported by the carrier. Internal gear teeth 46 of the eccentric gear engage the external teeth 38 of the sun gear. External gear teeth 48 of the eccentric gear engage the internal teeth 40 of the ring gear. The sun gear is held against rotation by transmission case 34. Carrier 42 is driveably connected to the input shaft 30.

A rear epicyclic gearing assembly 50 includes a planetary gear set and a second co-planar gear set. The planetary gear set includes a sun gear with external gear teeth 52, a ring gear with internal gear teeth 54, a carrier 56, and a set of planet gears 58 supported by the carrier and meshing with the sun gear and ring gear. The second co-planar gear set includes a sun gear with external gear teeth 60, a ring gear with internal gear teeth 62, and an epicyclic gear 64 supported by carrier 56 which is shared with the planetary gear set. Internal gear teeth 66 of the eccentric gear engage the external teeth 60 of the sun gear. External gear teeth 68 of the eccentric gear engage the internal teeth 62 of the ring gear. The ring gears of both the planetary gear set and the second co-planar gear set are driveably connected to the output shaft 32.

The rear epicyclic gearing assembly has four members that each rotate as a unit around the transmission axis. The first member is the sun gear of the co-planar gear set. The second member is the combination of the ring gear of the planetary gear set and the ring gear of the co-planar gear set. The third member is the shared carrier 56. The fourth member is the sun gear of the planetary gear set. The kinematic constraints of planetary gear sets and co-planar gear sets are such that the second and third members rotate at speeds that are weighted averages of the speeds of the first and fourth members, with the weighting factors determined by the numbers of teeth. The weighting factors are such that the speed of the second member is between the speeds of the first and third members and the speed of the third member is between the speeds of the second and fourth members.

Clutches 70, 72, 74, and 76 and brakes 78 and 80 are preferably hydraulically actuated friction clutches which releasably connect two elements when hydraulic pressure is applied and disconnect those elements when the hydraulic pressure is released. Clutch 70 releasably connects gearbox input shaft 30 to the sun gear of the planetary gear set. Clutch 72 releasably connects the ring gear of the front co-planar gear set to the sun gear of the planetary gear set. Clutch 74 releasably connects the ring gear of the front co-planar gear set to the sun gear of the second co-planar gear set. Clutch 76 releasably connects gearbox input shaft 30 to the carrier of the planetary gear set and second co-planar gear set. Brake 78 releasably connects the sun gear of the planetary gear set to the transmission case 34. Brake 80 releasably connects the carrier of the planetary gear set and second co-planar gear set to the transmission case 34.

The transmission ratio is selected by applying hydraulic pressure to two of the clutches and brakes as indicated in FIG. 3. The transmission is prepared for forward motion in first gear by applying clutch 74 and brake 80. To transition to second gear, brake 80 is progressively released while brake 78 is progressively engaged. To transition from second gear to third gear, brake 78 is progressively released while clutch 72 is progressively engaged. To transition from third gear to fourth gear, clutch 72 is progressively released while clutch 70 is progressively engaged. To transition from fourth gear to fifth gear, clutch 70 is progressively released while clutch 76 is progressively engaged. Clutch 74 is maintained in the engaged state while operating in the first five forward gears. To transition from fifth gear to sixth gear, clutch 74 is progressively released while clutch 70 is progressively engaged. To transition from sixth gear to seventh gear, clutch 70 is progressively released while clutch 72 is progressively engaged. To transition from seventh gear to eighth gear, clutch 72 is progressively released while brake 78 is progressively engaged. Clutch 76 is maintained in the engaged state while operating in gears five through eight.

The transmission is prepared for reverse motion by applying clutch 72 and brake 80. If desired, the transmission can be shifted into a second reverse ratio by progressively releasing clutch 72 while progressively engaging clutch 70, maintaining clutch 80 in the engaged state.

Figure 4:
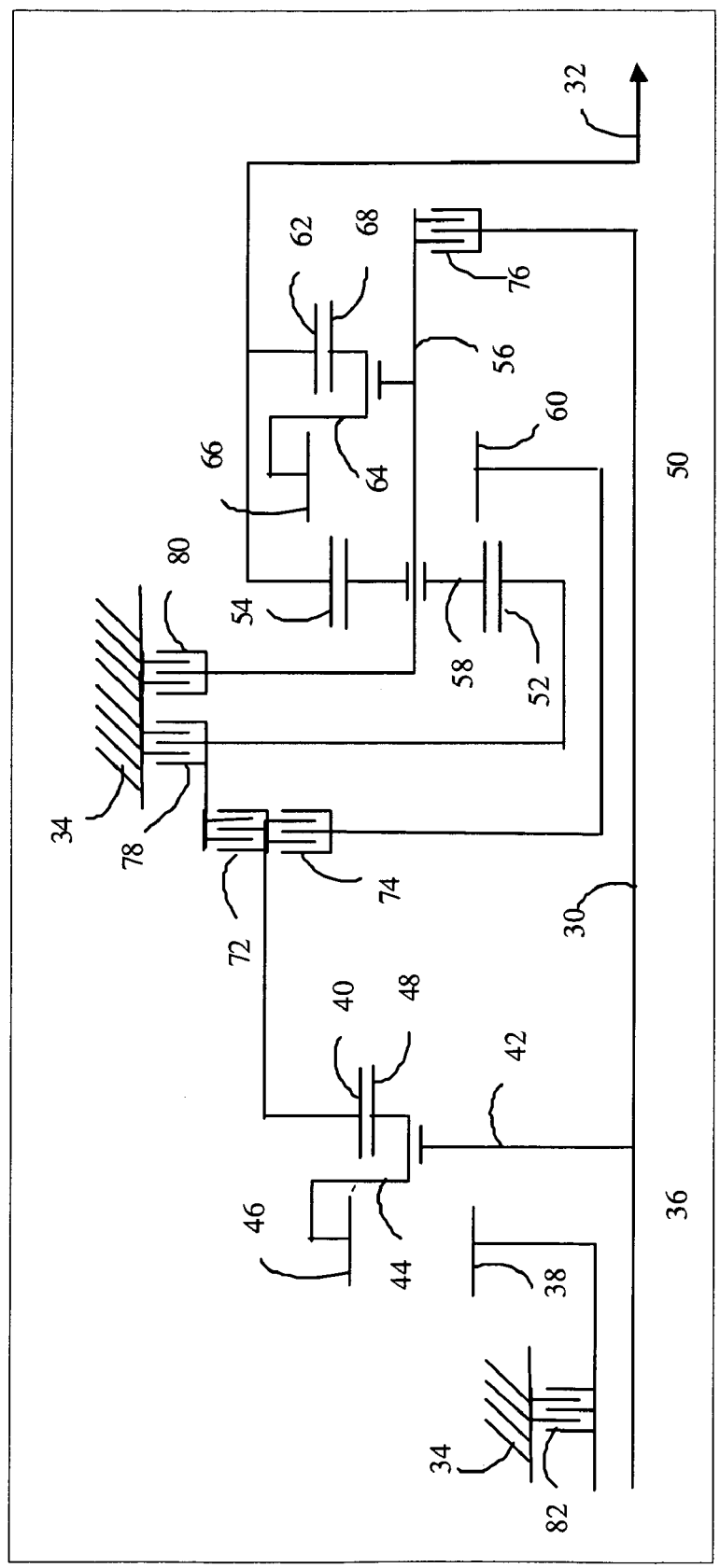
FIG. 4 is a schematic diagram of a transmission according to a second embodiment of the present invention which produces seven forward and one reverse speed ratios.

A transmission according to a second embodiment of the present invention is illustrated schematically in FIG. 4. Input shaft 30 is driven by the vehicle engine, preferably via a torque converter. Output shaft 32 drives the vehicle wheels, preferably via a differential. A rear epicyclic gearing assembly is as described above for the first embodiment.

A front co-planar gear set 36 includes a sun gear with external gear teeth 38, a ring gear with internal gear teeth 40, a carrier 42, and an epicyclic gear 44 supported by the carrier. Internal gear teeth 46 of the eccentric gear engage the external teeth 38 of the sun gear. External gear teeth 48 of the eccentric gear engage the internal teeth 40 of the ring gear. Carrier 42 is driveably connected to the input shaft 30.

Clutches 72, 74, and 76 and brakes 78, 80, and 82 are preferably hydraulically actuated friction clutches which releasably connect two elements when hydraulic pressure is applied and disconnect those elements when the hydraulic pressure is released. Clutch 72 releasably connects the ring gear of the front co-planar gear set to the sun gear of the planetary gear set. Clutch 74 releasably connects the ring gear of the front co-planar gear set to the sun gear of the second co-planar gear set. Clutch 76 releasably connects gearbox input shaft 30 to the carrier of the planetary gear set and second co-planar gear set. Brake 78 releasably connects the sun gear of the planetary gear set to the transmission case 34. Brake 80 releasably connects the carrier of the planetary gear set and second co-planar gear set to the transmission case 34. Brake 82 releasably connects the sun gear of the front co-planar gear set to the transmission case 34.

The transmission ratio is selected by applying hydraulic pressure to three of the clutches and brakes as indicated in FIG. 6. The transmission is prepared for forward motion in first gear by applying clutch 74 and brakes 80 and 82. To transition to second gear, brake 80 is progressively released while brake 78 is progressively engaged. To transition from second gear to third gear, brake 78 is progressively released while clutch 72 is progressively engaged. To transition from third gear to fourth gear, clutch 72 is progressively released while clutch 76 is progressively engaged. Brake 82 is maintained in the engaged state while operating in the first four forward gears. To transition from fourth gear to fifth gear, brake 82 is progressively released while clutch 72 is progressively engaged. Clutch 74 is maintained in the engaged state while operating in the first five forward gears. To transition from fifth gear to sixth gear, clutch 74 is progressively released while brake 82 is progressively engaged. To transition from sixth gear to seventh gear, clutch 72 is progressively released while brake 78 is progressively engaged. Clutch 76 is maintained in the engaged state while operating in gears four through seven.

The transmission is prepared for reverse motion by applying clutch 72 and brakes 80 and 82.

Figure 7:
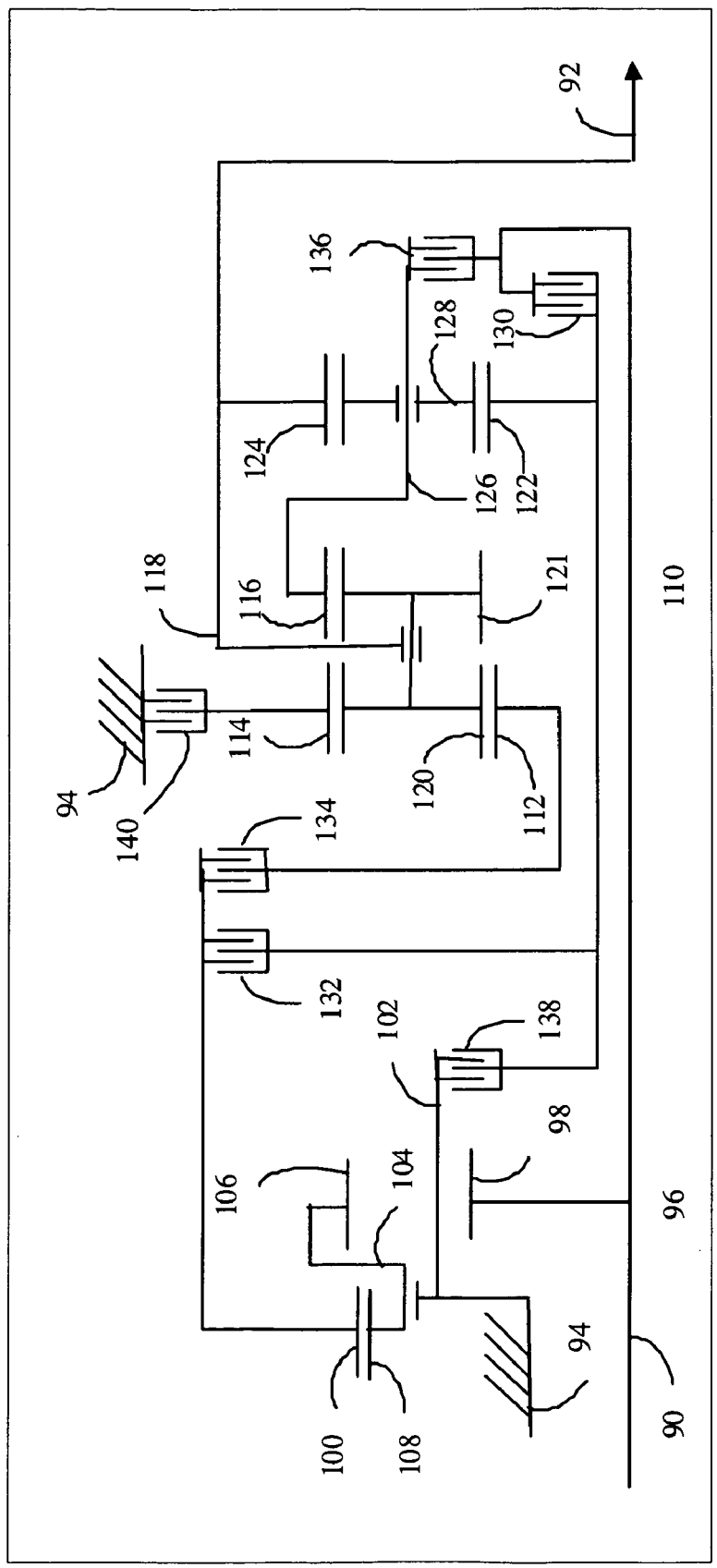
FIG. 7 is a schematic diagram of a transmission according to a third embodiment of the present invention which produces eight forward and two reverse speed ratios.

A transmission according to a third embodiment of the present invention is illustrated schematically in FIG. 7. Input shaft 90 is driven by the vehicle engine, preferably via a torque converter. Output shaft 92 drives the vehicle wheels, preferably via a differential.

A front co-planar gear set 96 includes a sun gear with external gear teeth 98, a ring gear with internal gear teeth 100, a carrier 102, and an epicyclic gear 104 supported by the carrier. Internal gear teeth 106 of the eccentric gear engage the external teeth 98 of the sun gear. External gear teeth 108 of the eccentric gear engage the internal teeth 100 of the ring gear. The carrier is held against rotation by transmission case 94. The sun gear is driveably connected to the input shaft 90.

A rear epicyclic gearing assembly 110 includes first sun gear 112, second sun gear 122, first ring gear 114, second ring gear 116, third ring gear 124, first carrier 118 and second carrier 126. A first set of planet gears with external gear teeth 120 and 121 is supported by the first carrier 118. Gear teeth 120 mesh with both the first sun gear 112 and first ring gear 114. Gear teeth 121 mesh with the second ring gear 116. Preferably, the number of gear teeth at 120 and 121 are identical and the number of gear teeth on ring gears 114 and 116 are identical. When this is the case, the speed of ring gear 114 and ring gear 116 will always be equal. Alternatively, the planet gears could be stepped in which case the speed of ring gear 114 and ring gear 116 would differ slightly. Carrier 118 extends radially between ring gear 114 and ring gear 116 and it driveably connected to both ring gear 124 and output shaft 92. Ring gear 116 is driveably connected to carrier 126. A second set of planet gears 128 is supported by carrier 126 and meshes with both sun gear 122 and ring gear 124.

The rear epicyclic gearing assembly has at least four members that each rotate as a unit around the transmission axis. The first member is sun gear 112. The second member is the combination of carrier 118 and ring gear 124. The third member is ring gear 116 and carrier 126. The fourth member is sun gear 122. The kinematic constraints of planetary gear sets are such that the second and third members rotate at speeds that are weighted averages of the speeds of the first and fourth members, with the weighting factors determined by the numbers of teeth. The weighting factors are such that the speed of the second member is between the speeds of the first and third members and the speed of the third member is between the speeds of the second and fourth members. If the first set of planet gears are stepped pinions, then ring gear 114 is a fifth member with a speed that is between the speeds of the second and fourth members.

Clutches 130, 132, 134, and 136 and brakes 138 and 140 are preferably hydraulically actuated friction clutches which releasably connect two elements when hydraulic pressure is applied and disconnect those elements when the hydraulic pressure is released. Clutch 130 releasably connects gearbox input shaft 90 to sun gear 122. Clutch 132 releasably connects the ring gear of the front co-planar gear set to sun gear 122. Clutch 134 releasably connects the ring gear of the front co-planar gear set to sun gear 112. Clutch 136 releasably connects gearbox input shaft 90 to ring gear 116 and carrier 126. Brake 138 releasably connects sun gear 122 to the transmission case 94. Brake 140 releasably connects ring gear 114 to the transmission case 94, which constrains the speed of ring gear 116 and carrier 126 to a value equal to or near zero.

The transmission ratio is selected by applying hydraulic pressure to two of the clutches and brakes as indicated in FIG. 9. The transmission is prepared for forward motion in first gear by applying clutch 134 and brake 140. To transition to second gear, brake 140 is progressively released while brake 138 is progressively engaged. To transition from second gear to third gear, brake 138 is progressively released while clutch 132 is progressively engaged. To transition from third gear to fourth gear, clutch 132 is progressively released while clutch 130 is progressively engaged. To transition from fourth gear to fifth gear, clutch 130 is progressively released while clutch 136 is progressively engaged. Clutch 134 is maintained in the engaged state while operating in the first five forward gears. To transition from fifth gear to sixth gear, clutch 134 is progressively released while clutch 130 is progressively engaged. To transition from sixth gear to seventh gear, clutch 130 is progressively released while clutch 132 is progressively engaged. To transition from seventh gear to eighth gear, clutch 132 is progressively released while brake 138 is progressively engaged. Clutch 136 is maintained in the engaged state while operating in gears five through eight.

The transmission is prepared for reverse motion by applying clutch 132 and brake 140. If desired, the transmission can be shifted into a second reverse ratio by progressively releasing clutch 132 while progressively engaging clutch 130, maintaining clutch 140 in the engaged state.

In accordance with the provisions of the patent statutes, the preferred embodiment has been described. However, it should be noted that alternate embodiments can be practiced otherwise than as specifically illustrated and described.

What is claimed is:

1. A multiple speed power transmission, comprising:
   an input shaft (30, 90);
   a transmission case (34, 94);
   a first co-planar gear set (36, 96) comprising a first sun (38, 98), a first ring (40, 100), a first carrier (42, 102), and a first eccentric gear (44, 104) supported by the first carrier and meshing with both the first sun and the first ring;
   a rear epicyclic gearing assembly (50, 110) comprising first (60, 112), second (54 and 62, 118 and 124), third (56, 116 and 126), and fourth (52, 122) rotating members such that the speeds of the second and third rotating members are a weighted average of the speeds of the first and fourth rotating members; and
   an output shaft (32, 92) connected to the second rotating member (54 and 62, 118 and 124).

2. The multiple speed power transmission of claim 1, further comprising:
   a first clutch (72, 132) releasably connecting the first ring (40, 100) to the fourth rotating member (52, 122);
   a second clutch (74, 134) releasably connecting the first ring (40, 100) to the first rotating member (60, 112);
   a third clutch (76, 136) releasably connecting the input shaft (30, 90) to the third rotating member (56, 116 and 126);
   a first brake (78, 138) releasably holding the fourth rotating member (52, 122) against rotation; and
   a second brake (80, 140) substantially releasably holding the third rotating member (56, 116 and 126) against rotation.

3. The multiple speed power transmission of claim 2, wherein a first member of the set consisting of the first sun (38, 98) and the first carrier (42, 102) is driveably connected to the input shaft (30, 90).

4. The multiple speed power transmission of claim 3, further comprising a means of holding a second member of the set consisting of the first sun (38, 98) and the first carrier (42, 102) against rotation.

5. The multiple speed power transmission of claim 4, wherein said means of holding a second member of the set consisting of the first sun (38, 98) and the first carrier (42, 102) against rotation is a third selectively releasable brake (82).

6. The multiple speed power transmission of claim 4, wherein said means of holding a second member of the set consisting of the first sun (38, 98) and the first carrier (42, 102) against rotation is a fixed connection to the transmission case (34, 94).

7. The multiple speed power transmission of claim 6, further comprising a fourth clutch (70, 130) releasably connecting the input shaft (30, 90) to the fourth rotating member (52, 122).

8. The multiple speed power transmission of claim 3, wherein the rear epicyclic gearing assembly (50) comprises:
   a simple planetary gear set comprising a second sun (52), a second ring (54), a second carrier (56), and a set of planet gears (58) supported by the second carrier and meshing with both the second sun and the second ring; and
   a second co-planar gear set comprising a third sun (60), a third ring (62) driveably connected to the second ring (54), the second carrier (56), and a second eccentric gear (64) supported by the second carrier and meshing with both the third sun and the third ring.

9. The multiple speed power transmission of claim 3, wherein the rear epicyclic gearing assembly (110) comprises:
   a first simple planetary gear set comprising a second sun (112), a second ring (114), a third ring (116), a second carrier (118), and a set of planet gears (120 and 121) supported by the second carrier, each planet gear meshing with the second sun, the second ring, and the third ring; and
   a second simple planetary gear set comprising a third sun (122), a fourth ring (124) connected to the second carrier (118), a third carrier (126) connected to the third ring (116), and a second set of planet gears (128) supported by the third carrier and meshing with both the third sun and the fourth ring.

10. A multiple speed power transmission, comprising:
    an input shaft (30);
    a transmission case (34);
    a first co-planar gear set (36) comprising a first sun (38), a first ring (40), a first carrier (42) driveably connected to the input shaft (30), and a first eccentric gear (44) supported by the first carrier and meshing with both the first sun and the first ring;
    a means of holding the first sun (38) against rotation;
    a rear epicyclic gearing assembly (50) comprising first (60), second (54 and 62), third (56), and fourth (52) rotating members such that the speeds of the second and third rotating members are a weighted average of the speeds of the first and fourth rotating members;
    a first clutch (72) releasably connecting the first ring (40) to the fourth rotating member (52);
    a second clutch (74) releasably connecting the first ring (40) to the first rotating member (60);
    a third clutch (76) releasably connecting the input shaft (30) to the third rotating member (56);
    a first brake (78) releasably holding the fourth rotating member (52) against rotation;
    a second brake (80) releasably holding the third rotating member (56) against rotation; and
    an output shaft (32) connected to the second rotating member (54 and 62).

11. The multiple speed power transmission of claim 10, wherein said means of holding the first sun (38) against rotation is a third selectively releasable brake (82).

12. The multiple speed power transmission of claim 10, wherein said means of holding the first sun (38) against rotation is a fixed connection to the transmission case (34).

13. The multiple speed power transmission of claim 12, further comprising a fourth clutch (70) releasably connecting the input shaft (30) to the fourth rotating member (52).

14. The multiple speed power transmission of claim 10, wherein the rear epicyclic gearing assembly (50) comprises:
- a simple planetary gear set comprising a second sun (52), a second ring (54), a second carrier (56), and a set of planet gears (58) supported by the second carrier and meshing with both the second sun and the second ring; and
- a second co-planar gear set comprising a third sun (60), a third ring (62) driveably connected to the second ring (54), the second carrier (56), and a second eccentric gear (64) supported by the second carrier and meshing with both the third sun and the third ring.

15. An epicyclic gearing assembly, comprising:
- a simple planetary gear set comprising a first sun (52), a first ring (54), a first carrier (56), and a set of planet gears (58) supported by the first carrier and meshing with both the first sun and the first ring; and
- a first co-planar gear set comprising a second sun (60), a second ring (62) driveably connected to the first ring, the first carrier (56), and a first eccentric gear (64) supported by the first carrier and meshing with both the second sun and the second ring.

16. A multiple speed power transmission comprising:
an input shaft (30);
an output shaft (32); and
gearing, brakes, and clutches arranged to produce multiple speed ratios between the input shaft and output shaft, the gearing including:
- a simple planetary gear set comprising a first sun (52), a first ring (54), a first carrier (56), and a set of planet gears (58) supported by the first carrier and meshing with both the first sun and the first ring; and
- a first co-planar gear set comprising a second sun (60), a second ring (62) driveably connected to the first ring and the output shaft, the first carrier (56), and a first eccentric gear (64) supported by the first carrier and meshing with both the second sun and the second ring.

17. The multiple speed power transmission of claim 16, wherein the gearing, brakes, and clutches further comprise:
- a front epicyclic gearing assembly (36) comprising first (38), second (40), and third (42) members such that the rotational speed of the second member is a weighted average of the speeds of the first and third members, wherein the third member is driveably connected to the input shaft (30);
- a means of holding the first member against rotation;
- a first clutch (72) releasably connecting the second member (40) to the first sun (52);
- a second clutch (74) releasably connecting the second member (40) to the second sun (60);
- a third clutch (76) releasably connecting the input shaft (30) to the first carrier (56);
- a first brake (78) releasably holding the first sun (52) against rotation; and
- a second brake (80) releasably holding the first carrier (56) against rotation.

18. The multiple speed power transmission of claim 17, wherein said means of holding the first member against rotation is a third selectively releasable brake (82).

19. The multiple speed power transmission of claim 17, wherein said means of holding the first member against rotation is a fixed connection to the transmission case (34).

20. The multiple speed power transmission of claim 19, further comprising a fourth clutch (70) releasably connecting the input shaft (30) to the first sun (52).

21. The multiple speed power transmission of claim 17, wherein the front epicyclic gearing assembly (36) is a second co-planar gear set comprising:
- a third sun (38) fixed to the transmission case (34);
- a third ring (40);
- a second carrier (42) driveably connected to the input shaft (30); and
- a second eccentric gear (44) supported by the second carrier and meshing with both the third sun and the third ring.

* * * * *